United States Patent [19]

Miyamoto et al.

[11] 4,306,056
[45] Dec. 15, 1981

[54] PROCESS FOR PRODUCING AN OLIGOESTER AND PRODUCING UNSATURATED POLYESTER RESIN BY USE THEREOF

[75] Inventors: Akira Miyamoto, Hiratsuka; Senzo Shimizu, Odawara; Fumitaka Satoh, Hiratsuka; Yasumitsu Higuchi, Hiratsuka; Toshiyuki Abe, Hiratsuka; Kohji Yamamoto, Hiratsuka, all of Japan

[73] Assignee: Mitsubishi Gas Chemical Company, Inc., Tokyo, Japan

[21] Appl. No.: 150,691

[22] Filed: May 16, 1980

[30] Foreign Application Priority Data

May 23, 1979 [JP] Japan .................................. 54-63719
Jun. 5, 1979 [JP] Japan .................................. 54-70450

[51] Int. Cl.$^3$ ............................................. C08G 63/42
[52] U.S. Cl. .................................... 528/297; 525/437; 525/438; 525/445; 525/446; 528/274; 528/303; 560/76; 560/96
[58] Field of Search ....................... 528/297, 274, 303; 525/437, 438, 445, 446; 560/76, 96

[56] References Cited

U.S. PATENT DOCUMENTS 3,546,176 12/1970 Umfreville ........................... 528/297
3,723,390 3/1973 Carpenter et al. ................... 528/297
3,838,106 9/1974 Shuki et al. .......................... 528/297

Primary Examiner—Lucille M. Phynes
Attorney, Agent, or Firm—Fleit & Jacobson

[57] ABSTRACT

Processes for producing an oligoester and producing unsaturated polyester resin by use of the oligoester using unsaturated dibasic acid or its anhydride and isophthalic acid as dibasic acid components, and propylene oxide as a polyol component, characterized by (a) the step of reacting isophthalic acid with propylene oxide in the presence of an amine compound catalyst to form an oligoester, (b) the step of removing volatile components from the oligoester by heating it at a temperature range of 180°–300° C., (c) the step of treating the resulting oligoester with silica-alumina compound having adsorbing property, and (d) the step of reacting the oligoester so treated with the unsaturated dibasic acid or its anhydride.

11 Claims, No Drawings

PROCESS FOR PRODUCING AN OLIGOESTER AND PRODUCING UNSATURATED POLYESTER RESIN BY USE THEREOF

BACKGROUND OF THE INVENTION

This invention relates to a process for producing an oligoester which is an intermediate for preparing unsaturated polyester resin from isophthalic acid and propylene oxide, and also relates to a process for producing unsaturated polyester resin from the oligoester and unsaturated dibasic acid or its anhydride.

In the present specification "unsaturated polyester resin" indicates the polyester resin which is prepared from dibasic acid components containing unsaturated dibasic acid and polyol components and is not yet mixed with a vinyl monomer as a crosslinking agent. The mixture of the unsaturated polyester resin and a vinyl monomer is referred to as "liquid unsaturated polyester resin" in the present specification.

It is known that unsaturated polyester resins obtained by using isophthalic acid as a dibasic acid component (sometimes hereinunder referred to as isophthalic acid type unsaturated polyester resin) are superior to unsaturated polyester resins obtained by using ortho-phthalic acid as a dibasic acid component with respect to such properties as water resistance, chemical resistance and mechanical properties. However, the time required for esterification is longer when isophthalic acid is used as a dibasic acid component than when ortho-phthalic acid is used.

The processes for producing isophthalic acid type unsaturated polyester resins are of two types; one stage and two stage. In the one stage, all of the dibasic acid components containing isophthalic acid and unsaturated dibasic acid are reacted with all of the polyol component, such as glycol, simultaneously. The two stage process comprises reacting isophthalic acid with a polyol component, such as a glycol, until the acid value amounts to less than a definite value, for example less than 30, to form an oligoester, followed by reacting unsaturated dibasic acid or its anhydride with the resulting oligoester which is a precursor for unsaturated polyester resin. Though the reaction time of the one stage process is shorter than that of the two stage process, it is known that unsaturated polyester resin produced by the one stage process are inferior to unsaturated polyester resins produced by the two stage process with respect to various properties. (Refer to "Reinforced Plastics," vol. 19, 1973 page 38.) For example unsaturated polyester resins obtained by the one stage process have low water resistance, chemical resistance and mechanical properties. So, to obtain unsaturated polyester resins with suitable characteristics the two stage process has been desired.

Many processes for producing unsaturated polyester resins by reacting an alkylene oxide with dicarboxylic acid or its anhydride have been proposed, but a process for producing unsaturated polyester resins by using isophthalic acid as a dibasic acid component and an alkylene oxide has not been utilized in the art. The reason is that the melting point of isophthalic acid is very high, so its solubility in a reaction medium is too low to allow the reaction to proceed.

The addition product of an aromatic dicarboxylic acid and an alkylene oxide can be easily produced by reacting the two components in the presence of an amine compound catalyst, such as a tertiary amine, so it was known that the addition product is utilized as an intermediate for saturated linear polyester, which is in general used for fibers and molding materials.

On the other hand, when the addition product is utilized as an intermediate for unsaturated polyester resin, the resulting resin is apt to be seriously discolored, and is limited to reproducibility of various characteristics with reference to the curing step of liquid unsaturated polyester resin and various properties of the cured resin, such as mechanical properties, chemical resistance, water resistance and so on, and additionally it has low storage stability. So the resin is not of practical use.

Reacting an aromatic dicarboxylic acid with an alkylene oxide in the absence of any catalyst has been attempted in order to overcome the above mentioned shortcoming. In this case the addition reaction between isophthalic acid and an alkylene oxide is hard to realize because of the high melting point of isophthalic acid and low solubility of isophthalic acid in the reaction medium and simultaneously polymerization of the alkylene oxide itself occurs to considerable extent. In addition, it takes much time to lower the acid value of the oligoester to the necessary extend. So, it has been believed to be impossible to economically obtain unsaturated polyester resins with suitable characteristics by reacting an isophthalic acid with an alkylene oxide.

Furthermore, when the oligoester of an isophthalic acid and an alkylene oxide is used as an intermediate for unsaturated polyester resins, whether the oligoester can fill requirements for various compositions of unsaturated polyester resins is practically important. Many attempts have been directed to use of an addition product of aromatic dibasic acid and an alkylene oxide as an intermediate for polyester resins, wherein the molar ratio of alkylene oxide to aromatic dibasic acid was approximately 2 as usual. Accordingly the addition product of isophthalic acid and an alkylene oxide produced by the prior art is usable only for the specific composition of unsaturated polyester resin, but is not suitable for various compositions thereof.

SUMMARY OF THE INVENTION

The inventors of this invention have carried out many experiments to overcome the various shortcomings incident to use of an addition product of alkylene oxide and isophthalic acid and have obtained new knowledges.

One object of this invention is to provide an alkylene oxide-isophthalic acid oligoester fitting for producing unsaturated polyester resins from components in various proportions.

Another object of this invention is to provide process for producing within a short time an oligoester which is useful as a precursor for unsaturated polyester resin.

Still another object of this invention is to provide a process for economically producing within a short time unsaturated polyester resins having excellent water resistance, chemical resistance and mechanical properties.

This invention relates to a process for producing an oligoester having 0.02–0.5 ether bond for one residue of isophthalic acid which comprises (a) the step of reacting 1 mol of isophthalic acid with 1.1–3.3 mol of propylene oxide in a reaction medium in the presence of an amine compound catalyst to form an oligoester, (b) the step of removing volatile components from the oligoester obtained in step (a) by heating the oligoester within the temperature range of 180°–300° C. and (c) the step of treating the oligoester with a silica-alumina compound having adsorbing property.

This also relates to a process for producing unsaturated polyester resin by use of the oligomer characterized by (a) the step of reacting isophthalic acid with propylene oxide in the presence of an amine compound catalyst to form an oligoester, (b) the step of removing volatile components from the oligoester by heating it at a temperature range of 180°–300° C., (c) the step of treating the resulting oligoester with a silica-alumina compound having adsorbing property, and (d) the step of reacting the oligoester so treated with the unsaturated dibasic acid or its anhydride.

DETAILED DESCRIPTION OF THE INVENTION

The first step of this invention relates to addition reaction of isophthalic acid with propylene oxide. The addition reaction is carried out by adding isophthalic acid to the reaction medium in the presence of an amine compound catalyst, followed by continuously introducing propylene oxide into the mixture with stirring at one atmospheric pressure or superpressurized pressure while heating the mixture at a definite temperature. It is necessary to employ from 1.1 to 3.3 molar proportion of propylene oxide for each molar proportion isophthalic acid. In this addition reaction, other saturated dibasic acids may be added to the reaction system in place of a part of isophthalic acid. Examples of the saturated dibasic acids to be used herein include orthe-phthalic acid, phthalic anhydride, terephthalic acid, tetrahydrophthalic acid, 3,6-endomethylene tetrahydrophthalic acid, pimelic acid, adipic acid, glutaric acid, succinic acid and sebacic acid. The other saturated dibasic acid may be used in an amount of less than 50 mol percent of isophthalic acid. Other alkylene oxides may be used in place of a part of propylene oxide. Examples of the alkylene oxides include ethylene oxide, butylene oxide, amylene oxide and hexene oxide. The other alkylene oxides may be used in an amount of less than 50 mol percent of propylene oxide.

In the first step, an object of using the amine compound catalyst is to promote the reaction of isophthalic acid and propylene oxide and the other object thereof is to provide oligoesters with a desired structure.

Examples of the amine compounds which are usable as a catalyst include primary amines, such as ethylamine, propylamine, butylamine, etc.; secondary amines, such as diethylamine, dibutylamine, diisoamylamine, etc.; tertiary amines, such as triethylamine, trimethylamine, tripropylamine, tri-n-butylamine, tri-n-amylamine, triethanolamine, diethylethanolamine, dimethylethylamine, di-n-butylisoamylamine, N,N,N',N'- tetraethylethylene diamine, etc.; carboxylic acid salts of these amines; and quaternary ammonium salts of carboxylic acid, such as bis (tetraethyl ammonium) terephthalate, tetraethyl ammonium benzoate, bis(2-hydroxyethyltriethyl ammonium) isophthalate, bis(2-hydroxypropyltriethyl ammonium) isophthalate, bis(2-hydroxyethyltripropyl ammonium) isophthalate, etc.

The addition reaction proceeds as shown in the following:

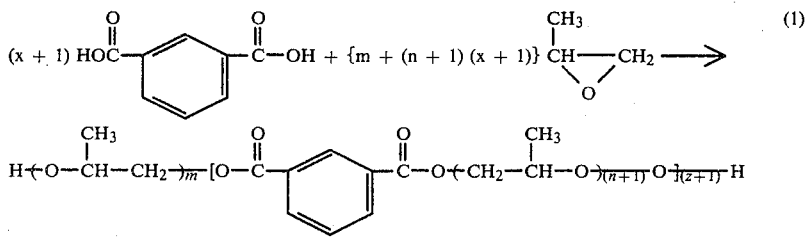

wherein n, m and x are 0 or integer of 1, 2, 3 ...

The larger the amount of the amine compound catalyst use, the greater the proportion of an oligoester of formula (1) in which n and m are each a relatively small integer in the resulting oligoester mixture. In other words, the larger the amount of the amine compound catalyst used, the lower the proportion of ether bond in the resulting oligoester and the smaller the degree of condensation represented by "x." Furthermore, the rate at which oligoester is formed becomes larger.

When the amount of catalyst used is 0.01–0.5% by weight of isophthalic acid, the condensation degree of the resulting oligoester is 1.5–5 (x=0.5–4).

The proportion of ether bond in the molecule of the resulting oligoester depends on the amount of catalyst used. In other words, the proportion of the ether bond in the oligoester can be adjusted by changing the amount of catalyst to be used. Since unsaturated polyester resins are derived from the oligoester, the fact that oligoester having a desired structure can be readily produced means that unsaturated polyester resin having desired characteristics can be easily produced. Therefore, according to the present invention the properties of unsaturated polyester resin can be easy to control. This is one of the features of this invention. As the proportion of ether bonds in oligoester increases, elasticity modulus and heat distortion temperature of the cured resin of unsaturated polyester resin produced from the oligoester lowers, elongation of the resin increases and flexibility of the resin is improved.

The proportion of ether bond in oligoester is quantitatively determined by ASTM D 2998-71. Thus, the proportion of ether bond in oligoester can be estimated for each process for producing oligoester.

Considering the above fact, the amount of the catalyst to be employed is in the range of 0.01–0.5% by weight on the basis of isophthalic acid.

In the first step of the present invention, inert organic solvent may be used as a reaction medium. Examples of solvents which are usable as a reaction medium includes esters, such as methyl acetate, ethyl acetate and butyl acetate; ethers, such as tetrahydrofuran, dioxane, dipropyl ether and dibutyl ether; ketones, such as acetone, methyl ethyl ketone, methyl isobutyl ketone and cyclohexanone; aromatic hydrocarbons, such as benzene, toluene and xylene; halogenated hydrocarbons, such as chloroform, carbon tetrachloride, dichloroethane, trichloroethane and chlorobenzene; and nitriles, such as acetonitrile and propionitrile. Additionally, the same oligoester as that obtained in the first step can be used as a reaction medium. The use of the oligoester is preferred because it is necessary to remove the oligoester as the reaction medium from the reaction product, whereas it is necessary to remove the organic solvent from the reaction product when the organic solvent is used as the reaction medium. The oligoester to be used as the reaction medium in the present invention may be the oligomer obtained by esterifying isophthalic acid with propylene glycol.

The production of oligoester is performed at atmosphere pressure or superpressure within a temperature range of 100°–230° C., preferably 110°–220° C. When the reaction is performed at superpressure, the pressure depends on reaction conditions, such as injection temperature of propylene oxide, kind and amount of solvents employed, amount of catalyst employed and reaction temperature. In general, the pressure may be in the range of 1.5–15 Kg/cm$^2$ G. The reaction time depends on the above reaction conditions and may be in the range of 15–180 minutes, preferably 15–120 minutes.

The second step of this invention comprises heating the reaction product obtained in the above first step to remove from the reaction system volatile components containing unreacted alkylene oxide, solvent, catalyst and other compounds formed by decomposition through thermal treatment. When a solvent is used as a reaction medium, it is necessary to remove the solvent by heating the reaction mixture at a reduced pressure or atmosphere pressure. To remove the volatile components, the reaction mixture is heated at 180°–300° C., preferably 220°–270° C. at atmosphere pressure or reduced pressure. When the acid value of the oligoester obtained by the first step does not lower sufficiently, esterification reaction proceeds during the heating step, whereby water formed is removed and the acid value of the oligoester lowers rapidly. According to the second step, useful properties can be imparted to the oligoester in the aim of preparing unsaturated polyester resin with good characteristics.

Most of the volatile components which give a bad effect on unsaturated polyester resin is removed in the second step. However removal of a slight amount of volatile components and non-volatile contaminant is necessary for obtaining unsaturated polyester resin with good characteristics. According to the third step of this invention, the remainder of the volatile and/or non-volatile components is removed. The third step comprises cooling to 100°–180° C. the oligoester obtained in the second step and treating the oligoester with a silica-alumina-containing adsorbent. Examples of the adsorbents include synthetic or natural zeolite, molecular sieves, acid clay, activated clay and synthetic adsorbent sold under the name of "Kyoword" produced by Kyowa Chemical Industry Co., Ltd.

The treatment by the adsorbent is carried out by the following two method: One comprises adding 0.1–10 parts by weight of the adsorbent to 100 parts by weight of the oligoester, and dispersing the adsorbent into the oligoester with stirring and filtering the adsorbent (contact-filter method). The other comprises passing the oligoester through a fixed bed composed of the adsorbent (fixed bed adsorbing method).

According to the process of the present invention with three steps as above-described in detail, the oligoester suitable for the intermediate of unsaturated polyester resin was prepared. In this process, the addition reaction of propylene oxide and isophthalic acid promotes in the presence of the amine compound catalyst. Contrarily, it may be possible to proceed the addition reaction in the absence of any catalyst. In this case the second and third steps of the present invention are not necessary because of no removal of any catalyst. Thus, the addition product prepared without using the catalyst may be used as it is for unsaturated polyester resin. If desired, of course, it may be treated by the second and/or third steps of the present invention.

In order to prepare unsaturated polyester resin according to the present invention the fourth step is practiced as follows. The fourth step of this invention comprises condensing the oligoester obtained in the third step and an unsaturated dibasic acid or its anhydride and optionally a saturated dibasic acid and/or a polyvalent alcohol to form an unsaturated polyester resin. Examples of the unsaturated dibasic acids include maleic anhydride, maleic acid, fumaric acid, itaconic acid and citraconic acid. The acid is usable alone or in a mixture.

As occasion demands, a saturated dibasic acid may be used with the unsaturated dibasic acid. Examples of the saturated dibasic acids include phthalic acid, halogenated phthalic acids, phthalic anhydride, halogenated phthalic anhydrides, isophthalic acid, terephthalic acid, terehydrophthalic acid, 3,6-endomethylenetetrahydrophthalic acid, succinic acid, adipic acid, glutaric acid, pimelic acid, azelaic acid and sebacic acid.

Examples of the polyvalent alcohols which are an optional component in the fourth step include ethylene glycol, diethylene glycol, triethylene glycol, polyethylene glycol, propylene glycol, dipropylene glycol, tripropylene glycol, polypropylene glycol, 1,3-butylene glycol, tetramethylene glycol, 1,6-hexenediol, neopentyl glycol, hydrogenated bisphenol A, adduct of ethylene oxide and bisphenol A, adduct of propylene oxide and bisphenol A.

The oligoester and the unsaturated dibasic acid and optionally the saturated dibasic acid and/or the polyvalent alcohol are mixed to condense the mixture. The mixing proportion of the components satisfies the following formula:

$$1 \leq (c+d)/(a+b) \leq 1.2 \tag{2}$$

wherein a is number of mols of unsaturated dibasic acid, b is number of mols of saturated dibasic acid, c is number of mols of oligoester and d is number of mols of polyvalent alcohol. The condensation is carried out by a conventional method within a temperature range of 150°–250° C. at a reduced pressure, superpressure or one atmospheric pressure. Termination of the condensation reaction is decided by the acid value of the resulting condensate. In general, the reaction terminates when the acid value amounts to less than 50, preferably less than 30.

The unsaturated polyester resins obtained by the condensation reaction are cooled to less than 150° C. by a conventional method. A vinyl monomer and optionally a polymerization inhibitor are added to the unsaturated polyester resin and the mixture is stirred to form a liquid unsaturated polyester resin. The vinyl monomer acts as a crosslinking agent, that is, it copolymerizes with the unsaturated polyester resin (unsaturated alkyl) to cure the resin. Examples of the vinyl monomers include vinyl benzenes, such as styrene, halogenated styrenes, alpha-methylstyrene, vinyltoluene and divinylbenzene; methacrylates or acrylates, such as methyl methacrylate, methyl acrylate and ethylene glycol dimethacrylate; and polyvalent allyl compounds, such as diallylphthalate and triallylcyanulate.

The polymerization inhibitors to be added as an optional component with a vinyl monomer include p-tertiary-butylcatechol, hydroquinone, toluhydroquinone, benzoquinone and copper naphthate, which was known in the art. The amount of the polymerization inhibitor added is in the range of 30–500 ppm on the basis of weight of unsaturated polyester resin.

According to the present invention, unsaturated polyester resin having a variety of characteristics can be produced within a short time by a simple operation.

The invention is further illustrated, but in no way limited by the following Examples. The percent and parts are by weight, unless otherwise specified.

REFERENCE EXAMPLE 1

Into a reactor equipped with agitator, partial reflux condenser, thermometer and pipe for introducing nitrogen gas were charged 1661 grs of isophthalic acid and 1674 grs of propylene glycol. The mixture was heated to 205° C. while introducing nitrogen gas into the mixture at speed of 400 ml/min. Water formed through condensation was distilled while refluxing propylene glycol by passing steam of 100° C. through the partial reflux condenser. 2950 Grs. of oligoester having acid value of 10, Gardner Color scale of 2 and viscosity of 1000 poise (25° C.) was obtained. The oligoester was to as oligoester A. Glycol content in the oligoester A was determined by ASTM D 2998-71. The analysis showed that the content of glycol component containing ether bonds was 0.7% by mol of the total glycol component.

EXAMPLE 1

Preparation of oligoester

Into an autoclave made of stainless steel equipped with an agitator were charged 1661 grs of isophthalic acid, 8 grs of triethylamine and 1470 grs of oligoester A. Air in the autoclave was completely replaced by nitrogen gas. The mixture was heated to 190° C. 1278 Grs of propylene oxide was continuously added over 40 minutes at stirring rate of 500 rpm while maintaining the temperature at 190° C. While introducing propylene oxide, the maximum pressure in the autoclave increased to 2.1 Kg/cm$^2$ G. After adding the propylene oxide, the reaction was continued at 190° C. for 10 minutes. The reaction product was charged into a reactor equipped with an agitator, partial reflux condenser and pipe for introducing nitrogen gas, and was heated to 250° C. while bubbling nitrogen gas into the reaction mixture at rate of 400 ml/min. The volatile components were distilled by passing steam of 100° C. through the partial reflux condenser. After 10 minutes, the reaction product, namely oligoester, was cooled to 100° C. Synthetic adsorbent (sold under trade name of Kyoword 700 by Kyowa Chemical Industry Co., Ltd.) in an amount of 1% on the basis of weight of oligoester was added to the oligoester. After sufficient stirring of the mixture, the adsorbent was filtered to obtain 4385 grs of oligoester having acid value of 5, Gardner color scale of 1–2 and viscosity of 1500 poise (25° C.). The oligoester was referred to as oligoester B. The glycol component in the oligoester was determined by quantitative analysis and the content of the glycol component containing ether bonds was 10.2% by mol of the total glycol component.

The number of mols of the total glycol was two times the number of mols of isophthalic acid.

In comparison with the Reference Example, oligoester having good characteristics was obtained within a short time.

EXAMPLES 2–4

Preparation of oligoester

Many kinds of oligoester were synthesized under conditions as given in Table 1 by using the process of Example 1. The properties of the resulting oligoesters are shown in Table 1.

The symbol "G/I" in Table 1 means molar ratio of glycol component to isophthalic acid component which was quantitatively determined by ASTM D 2998-71. The term "ether compound % by mol" means the content of glycol component containing ether bonds on the basis of total glycol component.

TABLE 1

| | | Example 2 | Example 3 | Example 4 |
|---|---|---|---|---|
| Amount of compound charged (gr) | oligoester A | 1470 | 1470 | 1470 |
| | propylene oxide | 1220 | 1278 | 1278 |
| | isophthalic acid | 1661 | 1661 | 1661 |
| | triethylamine | 16 | 4 | 1.3 |
| Reaction conditions in the first step | temperature (°C.) | 190 | 210 | 205 |
| | pressure (Kg/cm$^2$ G) | 2.1 | 2.0 | 2.1 |
| | time (minutes) | 35 | 35 | 40 |
| Treating conditions in the second step | temperature (°C.) | 250 | 250 | 260 |
| | pressure (atm) | 1 | 1 | 1 |
| | time (minutes) | 60 | 40 | 30 |
| Treatment by adsorbent* | | A | B | B |
| Properties of oligoester | yield (gr) | 4340 | 4370 | 4360 |
| | state (viscosity) | 1200 poise | — | viscous liquid |
| | ether compound (%) | 5 | 15 | 17.5 |
| | G/I | 2.0 | 1.9 | 1.85 |
| | acid value | 7 | 9 | 10 |
| | Gardner color scale | 1–2 | 1–2 | 1–2 |

*Synthetic adsorbent (Kyoword 700) was used.
A is contact-filter method.
B is adsorption through fixed bed.

EXAMPLES 5–7

Preparation of oligoester

Many kinds of oligoester were synthesized under conditions as given in Table 2 by using the process of Example 1. The properties of the resulting oligoester are shown in Table 2.

The adsorbent employed was Kyoword 700. The adsorbing treatment was effected at 150° C. The oligoester employed as a reaction medium was oligoester B.

TABLE 2

| | | Example 5 | Example 6 | Example 7 |
|---|---|---|---|---|
| Amount of compound charged (gr) | oligoester B | 123.5 | 123.5 | 128.5 |
| | propylene oxide | 808 | 808 | 508 |
| | isophthalic acid | 1661 | 1661 | 1661 |
| | triethylamine | 1.3 | 3.5 | 4.0 |
| Reaction conditions in the first step | temperature (°C.) | 180 | 180 | 210 |
| | pressure (Kg/cm$^2$) | 1.9 | 1.8 | 1.8 |
| | time (minutes) | 35 | 30 | 25 |
| Treating conditions | temperature (°C.) | 260 | 260 | 260 |

TABLE 2-continued

|  |  | Example 5 | Example 6 | Example 7 |
|---|---|---|---|---|
| in the second step | pressure (atm) | 1 | 1 | 1 |
|  | time (minutes) | 30 | 40 | 50 |
| Treatment by adsorbent* |  | B | A | A |
| Properties of oligoester | yield (gr) | 3560 | 3540 | 3030 |
|  | state | viscous liquid | viscous liquid | solid |
|  | ether compound (mol %) | 6 | 12 | 4 |
|  | G/I | 1.5 | 1.4 | 1.2 |
|  | acid value | 7 | 7 | 10 |
|  | Gardner color scale | 1-2 | 1-2 | 1-2 |

*Synthetic adsorbent (Kyoword 700) was used.
A is contact-filter method.
B is adsorption through fixed bed.

EXAMPLE 8

Preparation of oligoester

Into a stainless steel autoclave equipped with an agitator were charged 1661 grs of isophthalic acid, 8 grs of triethyl amine and 1470 grs of oligoester obtained by reacting isophthalic acid with propylene oxide. Air in the autoclave was sufficiently replaced by nitrogen gas. The mixture was heated to 190° C. 1278 Grs of propylene oxide was continuously added over 40 minutes with stirring at a stirring rate of 500 rpm while maintaining the temperature at 190° C. While introducing the propylene oxide, the maximum pressure in the autoclave increased to 2.1 Kg/cm$^2$ G. After adding the propylene oxide, the reaction was continued at 190° C. for 10 minutes. The reaction product was charged into a reactor equipped with an agitator, partial reflux condenser and pipe for introducing nitrogen gas, and was heated to 250° C. while bubbling nitrogen gas into the reaction mixture at rate of 400 ml/min. Water formed through condensation and volatile components were distilled by passing stream of 100° C. through the partial reflux condenser. After 10 minutes, the reaction product, namely oligoester, was cooled to 100° C. Synthetic adsorbent (sold under trade name of Kyoword 700 by Kyowa Chemical Industry Co., Ltd.) in an amount of 1% on the basis of weight of oligoester was added to the oligoester. After sufficiently stirring the mixture to disperse the adsorbent into the oligoester, the adsorbent was filtered to obtain 4385 grs of viscous oligoester having an acid value of 5 and Gardner color scale of 1-2. The oligoester was referred to as oligoester C.

Preparation of liquid unsaturated polyester resin

Into a reactor equipped with agitator, thermometer, pipe for introducing nitrogen gas and partial reflux condenser provided with thermometer at its top portion were charged 3968 grs of oligoester C, 204 grs of propylene glycol and 1319 grs of maleic anhydride. The mixture was heated to 225° C. to carry out the reaction while bubbling nitrogen gas into the reaction mixture at rate of 300 ml/min into the reactor. Water formed through condensation was distilled while refluxing propylene glycol in the condenser by passing steam of 100° C. through the condenser. When the acid value of the mixture reached to 20, the partial reflux condenser was taken off from the reactor. Water formed through condensation and unreacted propylene glycol were removed by passing nitrogen gas at rate of 1200 ml/min into the reactor. 5200 Grs of unsaturated polyester resin having acid value of 10, Gardner viscosity of X and Gardner color scale of 2-3 (the viscosity and the color scale were measured in a 40% solution in styrene) was obtained after 13.5 hours from starting of the reaction. 0.5 Grs of hydroquinone and 2600 grs of styrene were added to the unsaturated polyester resin to form liquid unsaturated polyester resin having styrene content of 33%. The liquid resin was stored at 40° C. for more than 3 months. After the storage, the liquid resin had excellent color tone and the cured resin obtained by curing the liquid unsaturated polyester resin had excellent properties.

EXAMPLE 9

Preparation of oligoester

Into a stainless steel autoclave equipped with agitator were charged 1661 grs of isophthalic acid, 1.3 grs of triethyl amine and 1235 grs of oligoester C. Air in the autoclave was sufficiently replaced by nitrogen gas. The mixture was heated to 180° C. 808 Grs of propylene oxide was continuously added over 35 minutes with stirring at a stirring rate of 500 rpm while maintaining the temperature at 180° C. While introducing propylene oxide, the maximum pressure in the autoclave increased to 1.9 Kg/cm$^2$ G. After adding the propylene oxide, the reaction was continued at 180° C. for 15 minutes. The reaction product was charged into a reactor equipped with agitator, partial reflux condenser and pipe for introducing nitrogen gas, and was heated to 260° C. while bubbling nitrogen gas into the reaction mixture at rate of 400 ml/min. Water formed through condensation and volatile components were distilled by passing steam of 100° C. through the partial reflux condenser. After 60 minutes, the reaction product, namely oligoester, was cooled to 100° C. The oligoester was passed through a fixed bed composed of synthetic adsorbent (sold under trade name of Kyoword 700 by Kyowa Chemical Industry Co., Ltd.) The yield of oligoester was 3550 grs. The resulting oligoester had an acid value of 23 and Gardner color scale of 1-2 and was highly viscous. The oligoester was referred to as oligoester D.

Preparation of liquid unsaturated polyester resin

Into a reactor equipped with agitator, thermometer, pipe for introducing nitrogen gas and partial reflux condenser provided with thermometer at its top portion were charged 3218 grs of oligoester D, 316 grs of propylene glycol and 2222 grs of fumaric acid. The mixture was heated to 205° C. to carry out the condensation reaction while bubbling nitrogen gas into the mixture at a rate of 400 ml/min into the reactor. Water formed through condensation was distilled while refluxing propylene glycol in the condenser by passing steam of 100° C. through the condenser. When the acid value of the mixture reached 35, the partial reflux condenser was taken off from the reactor. Water formed through condensation and unreacted propylene glycol were removed by passing nitrogen gas at rate of 1200 ml/min into the reactor. 6200 Grs of unsaturated polyester resin having the acid value of 24, Gardner viscosity of J-K and Gardner color scale of 2-3 (the viscosity and the color scale were measured in a 40% solution in styrene) was obtained after 9 hours from starting of the reaction. Styrene was added to the unsaturated polyester resin by a conventional method to form liquid unsaturated polyester resin having a styrene content of 45%.

EXAMPLE 10

Preparation of oligoester

Into a stainless steel autoclave equipped with an agitator were charged 1661 grs of isophthalic acid, 3.5 grs of triethyl amine and 1085 grs of oligoester D. Air in the autoclave was sufficiently replaced by nitrogen gas. The mixture was heated to 210° C. 508 Grs of propylene oxide was continuously added over 25 minutes while stirring at a rate of 500 rpm and maintaining the temperature at 210° C. While introducing the propylene oxide, the maximum pressure in the autoclave increased to 1.8 Kg/cm$^2$ G. After adding the propylene oxide, the reaction was continued at 210° C. for 10 minutes. Then the reaction product was charged into a reactor equipped with agitator, partial reflux condenser and pipe for introducing nitrogen gas. The charge was heated to 250° C. while bubbling nitrogen gas into the reaction mixture at the rate of 300 ml/min. Water formed through condensation and volatile components were distilled by passing steam of 100° C. through the partial reflux condenser. After 120 minutes, the reaction product, namely oligoester was cooled to 150° C. Synthetic adsorbent (sold under trade name of Kyoword 700 by Kyowa Chemical Industry Co., Ltd.) in an amount of 2% on the basis of weight of oligoester was added to the oligoester. After sufficiently stirring the mixture to disperse the adsorbent into the oligoester, the adsorbent was filtered to obtain 3020 grs of oligoester having the acid value of 15 and Gardner color scale of 1–2, which was solid at room temperature. The oligoester was referred to as oligoester E.

Preparation of liquid unsaturated polyester resin

Into a reactor equipped with agitator, thermometer, pipe for introducing nitrogen gas and partial reflux condenser provided with thermometer at its top portion were charged 2751 grs of oligoester E, 187 grs of propylene glycol, 3657 grs of diethylene glycol, 1208 grs of maleic anhydride and 3597 grs of adipic acid. The mixture was heated to 220° C. to carry out the reaction while introducing nitrogen gas at the rate of 300 ml/min into the reactor. Water formed through condensation was distilled while refluxing propylene glycol in the condenser by passing steam of 100° C. through the condenser. When the acid value of the mixture reached to 20, the partial reflux condenser was taken off from the reactor. Water formed through condensation and unreacted propylene glycol were removed by bubbling nitrogen gas at the rate of 1200 ml/min into the mixture. 10250 Grs of unsaturated polyester resin having the acid value of 12.8, Gardner viscosity of Q–R and Gardner color scale of 3 (the viscosity and the color scale were measured in a 40% solution in styrene) was obtained after 8 hours from starting of the reaction. Styrene was added to the unsaturated polymer resin by a conventional method to form a liquid unsaturated polyester resin.

EXAMPLE 11

Preparation of oligoester

Into a stainless steel autoclave equipped with an agitator were charged 1661 grs of isophthalic acid, 3.2 grs of triethyl amine and 1300 grs of mixed xylene. Air in the autoclave was sufficiently replaced by nitrogen gas. The mixture was heated to 140° C. with mild stirring at a stirring rate of 500 rpm. 1278 Grs of propylene oxide was continuously added over 90 minutes while maintaining the temperature at 140° C. After adding the propylene oxide, the reaction was further continued at 140° C. for 15 minutes. Then the mixed xylene was distilled at a reduced pressure at 120° C. to remove it. Into a reactor equipped with agitator, partial reflux condenser and pipe for introducing nitrogen gas and heated to 260° C. while bubbling nitrogen gas into the mixture at rate of 400 ml/min. Water formed through condensation and volatile components were distilled by passing steam of 100° C. through the partial reflux condenser. After 60 minutes, the reaction product, namely oligoester, was cooled to 100° C. Synthetic adsorbent (sold under trade name of Kyoword 700 by Kyowa Chemical Industry Co., Ltd.) in an amount of 1% on the basis of weight of the oligoester was added to the oligoester. After sufficiently stirring the mixture to disperse the adsorbent into the oligoester, the adsorbent was filtered to obtain 2900 grs of viscous oligoester having the acid value of 5 and Gardner color scale of 1–2. The oligoester was referred to as oligoester F.

Preparation of liquid unsaturated polyester resin

Into a reactor equipped with agitator, thermometer, pipe for introducing nitrogen gas and partial reflux condenser provided with thermometer at its top portion were charged 2648 grs of oligoester F, 68 grs of propylene glycol, 667 grs of phthalic anhydride and 883 grs of maleic anhydride. The mixture was heated to 220° C. to carry out the reaction while bubbling nitrogen gas at rate of 300 ml/min into the mixture. Water formed through condensation was distilled while refluxing propylene glycol in the condenser by passing steam of 100° C. through the condenser. When the acid value of the mixture reached to 35, the partial reflux condenser was taken off from the reactor. Water formed through condensation and unreacted propylene glycol were removed by passing nitrogen gas at the rate of 1200 ml/min into the reactor. 3900 Grs of unsaturated polyester resin having the the acid value of 26, Gardner viscosity of P–Q and Gardner color scale of 2–3 (the viscosity and the color scale were measured in a 40% solution in styrene) was obtained after 9.5 hours from starting of the reaction. Styrene was added to the unsaturated polyester resin by a conventional method to form liquid unsaturated polyester resin.

EXAMPLE 12

Preparation of oligoester

Into a stainless steel autoclave equipped with an agitator were charged 1661 grs of isophthalic acid, 4.7 grs of triethyl amine and 1300 grs of mixed xylene. Air in the autoclave was sufficiently replaced by nitrogen gas. The mixture was heated to 160° C. with mold stirring at a stirring rate of 500 rpm. 930 Grs of propylene oxide was continuously added over 70 minutes while maintaining the temperature at 160° C. After adding the propylene oxide, the reaction was continued at 160° C. for 15 minutes. The mixture was cooled to 120° C., and the mixed xylene was distilled at a reduced pressure to remove it. The reaction product was charged into a reactor equipped with agitator, partial reflux condenser and pipe for introducing nitrogen gas, and was heated to 250° C. while bubbling nitrogen gas into the mixture at rate of 300 ml/min. Water formed through condensation and volatile components were distilled by passing steam of 100° C. through the partial reflux condenser. After 60 minutes, the reaction product, namely oligoester was cooled to 150°. The oligoester was passed through a fixed bed composed of synthetic adsorbent (sold under trade name of Kyoword 700 by Kyowa Chemical Industry Co., Ltd.) The yield of the oligoester was 2450 grs. The resulting oligoester had the acid value of 21 and Gardner color scale of 1-2, and was very viscous. The oligoester was referred to as oligoester G.

Preparation of liquid unsaturated polyester resin

Into a reactor equipped with agitator, thermometer, pipe for introducing nitrogen gas and partial reflux condenser provided with thermometer at its top portion were charged 2251 grs of oligoester G, 171 grs of propylene glycol, 1057 grs of dipropylene glycol and 1325 grs of maleic anhdyride. The mixture was heated to 230° C. to carry out the condensation reaction while bubbling nitrogen gas into the mixture at rate of 300 lm/min. Water formed through condensation was distilled while refluxing propylene glycol in the condenser by passing steam of 100° C. through the condenser. When the acid value of the mixture reached to 22.5, the partial reflux condenser was taken off from the reactor. Water formed through condensation and unreacted propylene glycol were removed by passing nitrogen gas at rate of 1200 ml/min into the reactor. 4500 Grs of unsaturated polyester resin having the acid value of 25.5, Gardner viscosity of O-P and Gardner color scale of 3 (the viscosity and the color scale were measured in a 40% solution in styrene) was obtained after 10 hours from starting of the reaction. Styrene was added to the unsaturated polyester resin by a conventional method to form liquid unsaturated polyester resin.

EXAMPLE 13

Preparation of oligoester

Into a stainless steel autoclave equipped with agitator were charged 1661 grs of isophthalic acid, 8.6 grs of triethyl amine and 1300 grs of mixed xylene. Air in the autoclave was sufficiently replaced by nitrogen gas. The mixture was heated to 120° C. with mild stirring at a stirring rate of 500 rpm. 726 Grs of propylene oxide was continuously added over 120 minutes while maintaining the temperature at 120° C. After adding the propylene oxide, the reaction was continued at 120° C. for 15 minutes. The reaction was charged into a reactor equipped with agitator, partial reflux condenser and pipe for introducing nitrogen gas, and was heated to 260° C. while bubbling nitrogen gas into the mixture at rate of 300 ml/min. Water formed through condensation and volatile components were distilled by passing steam of 100° C. through the partial reflux condenser. After 100 minutes, the reaction product, namely oligoester, was cooled to 150° C. The oligoester was passed through synthetic adsorbent (sold under trade name of Kyoword 700 by Kyowa Chemical Industry Co., Ltd.). The yield of oligoester was 2200 grs. The resulting oligoester had the acid value of 66 and Gardner color scale of 1-2, and was solid at room temperature. The oligoester was referred to as oligoester H.

Preparation of liquid unsaturated polyester resin

Into a reactor equipped with agitator, thermometer, pipe for introducing nitrogen gas and partial reflux condenser provided with thermometer at its top portion were charged 2020 grs of oligoester H, 160 grs of propylene glycol, 1876 grs of neopentyl glycol and 2438 grs of fumaric acid. The mixture was heated to 210° C. to carry out the condensation reaction while bubbling nitrogen gas into the mixture at rate of 300 ml/min. Water formed through condensation was distilled while refluxing propylene glycol in the condenser by passing steam of 100° C. through the condenser. When the acid value of the mixture reached to 40, the partial reflux condenser was taken off from the reactor. Water formed through condensation and unreacted propylene glycol were removed by passing nitrogen gas at rate of 1200 ml/min into the reactor. 5680 Grs of unsaturated polyester resin having the acid value of 27.5, Gardner viscosity of S-T and Gardner color scale of 3 (the viscosity and the color scale were measured in a 40% solution in styrene) was obtained after 17 hours from starting of the reaction. Styrene was added to the unsaturated polyester resin by a conventional method to form liquid unsaturated polyester resin having styrene.

What is claimed is:

1. A process for producing an oligoester having 0.02-0.5 ether bond for one residue of isophthalic acid which comprises (a) the step of reacting 1 mol of isophthalic acid with 1.1-3.3 mols of propylene oxide in a reaction medium in the presence of an amine compound catalyst, (b) the step of removing volatile components from the oligoester obtained in step (a) by heating the oligoester at a temperature range of 180°-300° C. and (c) the step of treating the resulting oligoester with a silica-alumina compound having adsorbing property.

2. The process as defined in claim 1 wherein the reaction medium is an oligoester obtained by reacting isophthalic acid with propylene oxide and/or propylene glycol.

3. The process as defined in claim 1 wherein the reaction medium is an inert organic solvent.

4. The process as defined in claim 3 wherein the inert organic solvent is selected from the group consisting of esters, ethers, ketones, aromatic hydrocarbons, halogenated hydrocarbons and nitriles.

5. The process as defined in claim 1 wherein the amine compound catalyst is a tertiary amine.

6. A process for producing unsaturated polyester resin from an oligoester and unsaturated dibasic acid or its anhydride which comprises: (a) the step of reacting isophthalic acid with propylene oxide in the presence of an amine compound to form an oligoester, (b) the step of removing volatile components from the oligoester obtained in step (a) by heating it at a temperature range of 180°-300° C., (c) the step of treating the resulting oligoester with silica-alumina compound having adsorbing property, and (d) the step of reacting the oligoester so treated with an unsaturated dibasic acid or its anhydride.

7. The process as defined in claim 6 wherein the reaction medium is an inert organic solvent.

8. The process as defined in claim 7 wherein the inert organic solvent is selected from the group consisting of esters, ethers, ketones, aromatic hydrocarbons, halogenated hydrocarbons and nitriles.

9. The process as defined in claim 6 wherein the amine compound catalyst is a tertiary amine.

10. The process as defined in claim 6 wherein in the step (d) is used a mixture of the unsaturated dibasic acid and a saturated dibasic acid.

11. The process as defined in claim 6 wherein in the step (d) a polyvalent alcohol is used with the unsaturated dibasic acid.

* * * * *